Aug. 26, 1930.  J. W. FRAZIER  1,773,986
DRAG LINK
Original Filed June 1, 1928   2 Sheets-Sheet 1
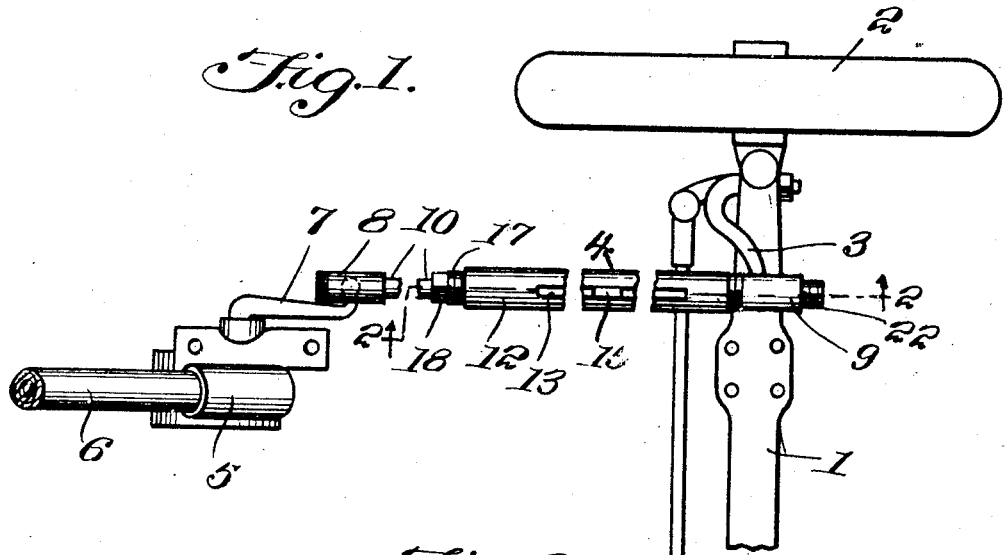
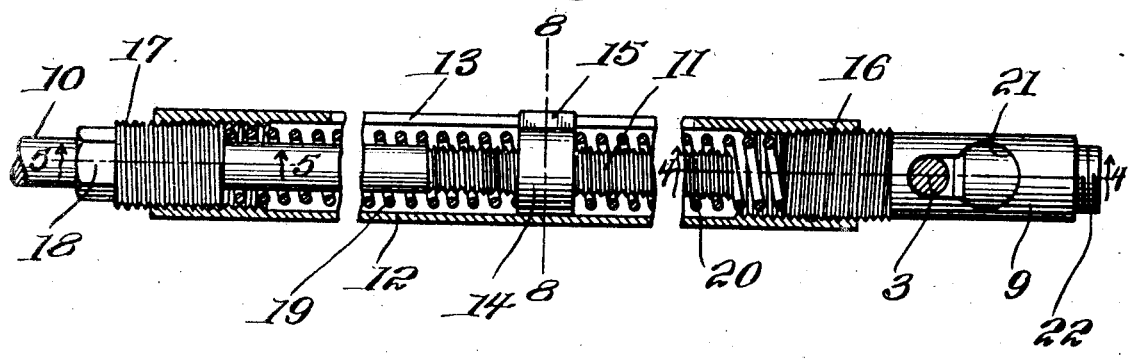
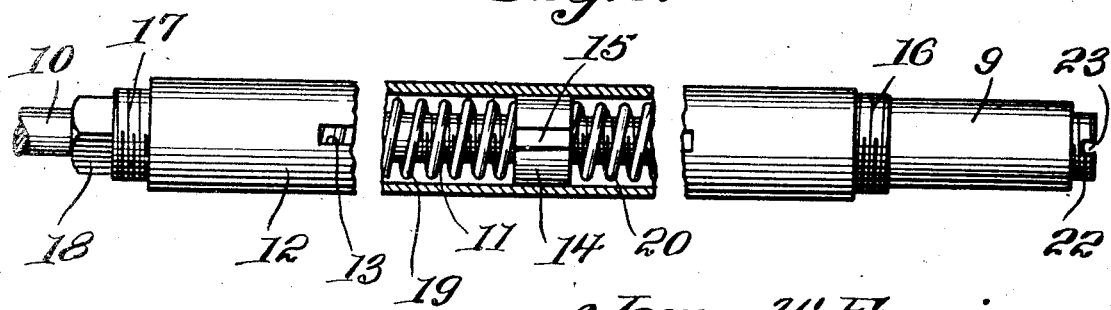
James W. Frazier
INVENTOR
BY Victor J. Evans
ATTORNEY
WITNESS: J. L. Wright Aug. 26, 1930.  J. W. FRAZIER  1,773,986
DRAG LINK
Original Filed June 1, 1928   2 Sheets-Sheet 2
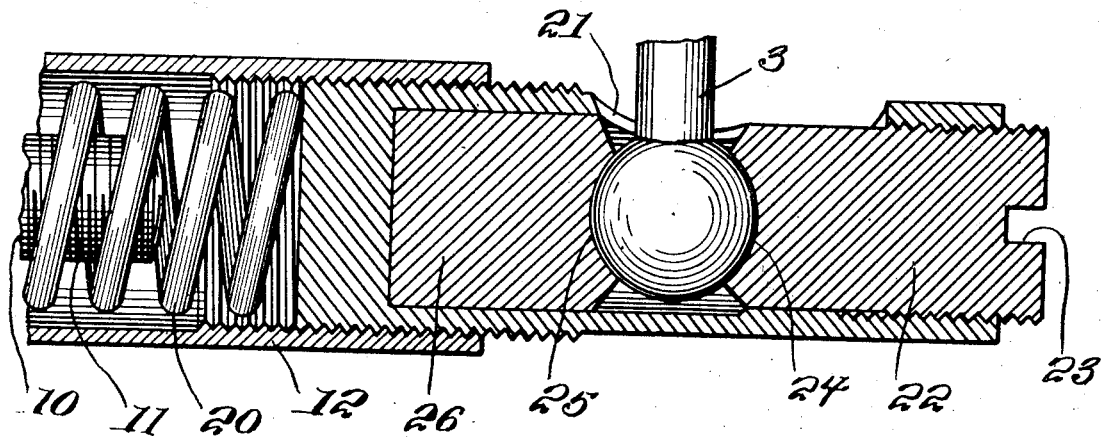
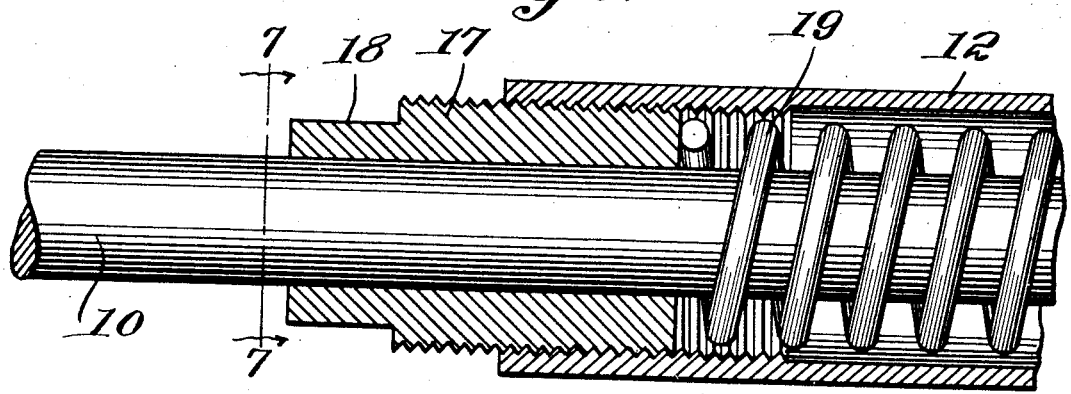
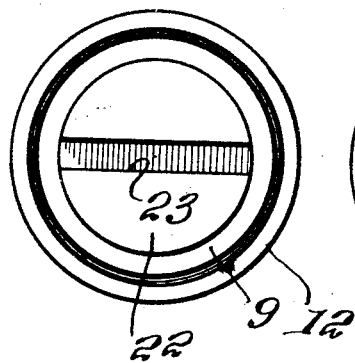
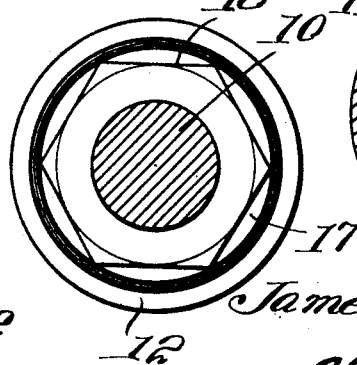
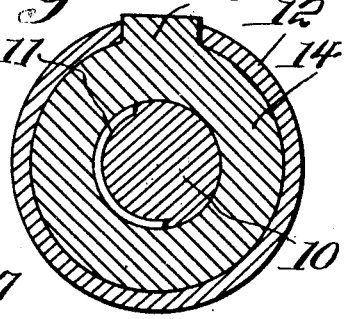
James W. Frazier
INVENTOR
BY Victor J. Evans
ATTORNEY
WITNESS: J.T.L. Wright Patented Aug. 26, 1930

1,773,986

UNITED STATES PATENT OFFICE

JAMES WALTER FRAZIER, OF SAN ANTONIO, TEXAS, ASSIGNOR TO PIERCE J. BERESFORD, OF SAN ANTONIO, TEXAS

DRAG LINK

Application filed June 1, 1928, Serial No. 282,243. Renewed March 5, 1930.

My present invention has reference to a drag link between the steering arm and the steering lever arm of an automobile or truck, and my primary object is the provision of a device for this purpose that has associated therewith simple, durable, strong and practical means for stabilizing the steering mechanism to an extent that will render the driving of the machine easy, absorb shocks to which the same is ordinarily subjected and will prevent free angle movement or wiggling of the steering wheels to overcome what is commonly termed shimmying of the machine, and also which may be adjusted for employment on different types and sizes of automobiles and trucks.

This invention will be fully and comprehensively understood from a consideration of the following detailed description when read in connection with the accompanying drawings which form part of the application, with the understanding, however, that the improvement is capable of extended application and is not confined to the exact showing of the drawings nor to precise construction described and, therefore, such changes and modifications may be made therefrom as do not affect the spirit of the invention nor exceed the scope thereof as expressed in the appended claims.

In the drawings:

Figure 1 is a plan view to illustrate the application of my improvement.

Figure 2 is a sectional view approximately on the line 2—2 of Figure 1.

Figure 3 is a top plan view of the device illustrated by Figure 2.

Figure 4 is an enlarged sectional view approximately on the line 4—4 of Figure 2.

Figure 5 is a similar sectional view approximately on the line 5—5 of Figure 2.

Figure 6 is an end view.

Figure 7 is a sectional view approximately on the line 7—7 of Figure 5.

Figure 8 is a sectional view on an enlarged scale approximately on the line 8—8 of Figure 2.

Referring now to the drawings in detail, the numeral 1 designates the front axle of an automobile or truck, 2, one of the steering wheels that has its stub axle mounted on the forked end of the axle 1, 3 the steering arm, 4 the knuckle connecting rod, 5 the steering gear case for the steering post 6, 7 the steering arm lever which is operated by the turning of the steering post. Both the steering arm lever 7 and the steering arm 3 have ball ends, and these balls are received in the usual sockets 8 and 9, respectively.

Screwed in or otherwise connected with the socket 8 and extending in the direction of the socket 9 there is a rod 10. This rod has its outer or free end threaded, as at 11, and the said rod is centrally received in a sleeve or barrel 12. The barrel is provided with an elongated longitudinal slot or opening 13, and screwed on the threaded end 11 of the rod 10 there is a nut member 14 which is preferably round in plan to correspond with the shape of the bore of the sleeve or barrel 12. The nut is formed on its periphery with a lug extension 15 that is received through the slot 13 and which contacts with the side walls thereof, thus holding the nut from turning in the barrel but permitting the said nut to move with the rod 10. The socket 9 has a solid extension which is provided with left-hand pitch threads 16 that are screwed in the barrel 12. The socket is, therefore, adjustably connected with the barrel. In the second end of the barrel there is screwed a nut or bushing 17 that has right hand pitch threads, the outer end of the said nut or bushing having an extension provided with angle facets 18 for the engagement of the jaws of a wrench, and whereby the said nut or bushing may be adjustably secured in this end of the barrel.

The rod 10 passes through a central opening in the nut or bushing 17.

Received in the barrel, surrounding the rod 10 and contacting with the opposite faces of the nut 14 there are compression springs 19 and 20, respectively. One end of the spring 19 contacts with the nut or bushing 17, and the outer end of the spring 20 contacts with the end of the socket member 9. It will be obvious that by adjusting the socket members the tension of the springs may be regulated. It will be likewise obvious that by removing the rod 10 from its connection with the steering lever arm and by turning the said rod, the nuts 14 may be adjustably arranged thereon, so that either of the springs 19 or 20 may be tensioned. These springs 19 and 20 are of an equal strength and ordinarily the same serve as compensating springs for holding the nut centrally in the barrel, but the springs are designed to be independently adjusted with respect to the tension or strength thereof in accordance with the condition of the parts of the automobile or truck upon which my improvement is arranged.

If desired, both of the sockets 8 and 9 may be of a similar construction and may be provided with key hole openings 21 in which the ball heads of the arms 7 and 3 are received, the said ball heads passing first through the wider passages of the slots or openings and are forced into inner restricted passages by headless bolts 22. The bolts 22 have their outer ends kerfed, as at 23, so that the same may be screwed in the sockets.

Of course, the inner faces of the bolts 22 are concaved, as at 24, to provide pockets for the ball heads and the opposite faces of the ball heads are received in similar pockets 25 provided in bearing blocks 26 which are arranged in the sockets.

With my improvement it will be obvious that the truck or automobile upon which the same is arranged will have its steering mechanism controlled to an extent that will render the driving of the machine easy, absorb shocks to which the front wheels and the driving mechanism is subjected, will hold the front wheels in a straight ahead direction and prevent any liability of wiggling, or accidental side movements thereof. It will be also obvious that by providing different size rods 10 and different compression springs of different strengths the improvement may be successfully applied upon different sizes and types of automobiles and trucks.

Having described the invention, I claim:

1. A stabilizing drag link to be arranged between the steering lever arm and the steering arm for the front wheel of an automobile or truck, comprising a socket member freely connected to the end of the steering lever arm, a threaded rod extending from the socket member, a barrel in which the rod is freely received, a socket connection between the barrel and the steering arm, a nut screwed on the rod and received in the barrel, means permitting a movement of the nut with the rod, but preventing the turning of the nut on the rod, and compensating springs in the barrel and exerting a pressure upon the opposite faces of the nut.

2. A stabilizing and shock absorbing drag link, to be arranged between the steering lever arm and the steering arm of an automobile or truck, comprising a socket loosely connected to the steering lever arm, a threaded rod extending longitudinally therefrom, a barrel in which the threaded end of the rod is received, a nut screwed on the rod and received in the barrel, a lug on the nut and said barrel having an elongated slot receiving the lug therethrough, a right hand pitch threaded bushing screwed in one end of the barrel and through which the rod is freely guided, a left hand pitch socket screwed in the second end of the bolt and in which socket the end of the steering arm is loosely received, compensating springs in the barrel surrounding the bolt and exerting a pressure between the opposite faces of the nut, the socket and the bushing.

3. A stabilizing and shock absorbing drag link, to be arranged between the ball steering lever arm and the ball headed steering arm for a front wheel of an automobile or truck, comprising a socket member in which the ball head of the steering lever arm is received, a rod having an outer threaded end extending longitudinally from the socket member, a slotted barrel in which the rod is received, a nut screwed on the rod, received in the barrel and having a lug that passes through the slot in the barrel, a right hand pitch threaded bushing screwed in one end of the barrel and through which the rod is guided, a socket member for the ball head of the steering arm having left hand pitch threads screwed in the second end of the barrel, compensating springs surrounding the rod and exerting pressure between the opposite faces of the nut and the confronting faces of the bushing and last mentioned socket, both of said sockets having key hole openings communicating with the walls thereof and through which the ball ends of the arms are received, a bearing lug in each socket of the ball head of the arms, and a kerfed headless bolt screwed in the outer end of each socket and having its inner end concaved to provide with the bearing member a pocket for the ball heads of the said arms.

In testimony whereof I affix my signature.

JAMES WALTER FRAZIER.